United States Patent [19]

Varma

[11] 4,317,872
[45] Mar. 2, 1982

[54] LEAD ACID BATTERY WITH GEL ELECTROLYTE

[75] Inventor: Brajendra P. Varma, Levittown, Pa.

[73] Assignee: Gould Inc., Rolling Meadows, Ill.

[21] Appl. No.: 143,967

[22] Filed: Apr. 25, 1980

[51] Int. Cl.³ ............................................. H01M 6/14
[52] U.S. Cl. ................................... 429/190; 429/204; 429/225; 429/248
[58] Field of Search ........................ 429/190, 199–201, 429/204, 205, 248, 252, 132, 136, 225

[56] References Cited

U.S. PATENT DOCUMENTS

| | | | |
|---|---|---|---|
| 1,496,725 | 6/1924 | Moore | 429/190 |
| 2,181,299 | 11/1939 | Burgess | 429/252 |
| 3,457,112 | 7/1969 | Reber | 429/190 X |
| 3,652,338 | 3/1972 | Gharkey et al. | 429/252 X |
| 3,798,070 | 3/1974 | Ruben | 429/205 X |
| 4,140,840 | 2/1979 | Ruben | 429/190 |

Primary Examiner—Charles F. Lefevour
Attorney, Agent, or Firm—Augustus J. Hipp

[57] ABSTRACT

This invention is directed to a lead-acid battery utilizing a novel electrolyte which includes a silica component. The silica component includes silica particles, means for repelling the particles from each other and for catalyzing the formation of siloxane cross-linkages and a sulfuric acid component. The lead-acid battery includes a container, a plurality of electrodes substantially enclosed by the container, and an electrolyte in substantial physical contact with the plurality of electrodes.

A novel separator material having a silicate component for use in a lead-acid battery is also included in this invention. The separator material includes a silicate component integrally mixed with an oxygen compound of boron forming a microfiber mat. The mat has a pore size between about 0.5 to 10 microns in diameter and an electrical resistance of about 0.01 ohms per square inch for a 0.05 inch thickness.

19 Claims, 18 Drawing Figures

CAPACITY OF GEL CELLS WITH VARYING CONCENTRATION OF $SiO_2$ IN THE GEL

| VOL.RATIO = 1.400 Acid / LUDOX | % Wt. of $SiO_2$ MIXTURE | % Wt. of $H_2SO_4$ MIXTURE | APPROXIMATE Sp.Gr. of $H_2SO_4$ in the MIXTURE | % RATED CAPACITY ||||| 
|---|---|---|---|---|---|---|---|---|
| | | | | CELLS OF GRO.F-1 (Gel cells with Dexiglas wrapped Negative Plates) || CELLS OF GRO.F-2 (Gel cells with spacers) || CELLS OF GR.F-3 (Conventional cells) |
| | | | | CELL Capacity | Average | CELL Capacity | Average | Average capacity of four cells 1.285, Acid |
| 6:1 | 3.80 | 46.14 | 1.3569 | 124.9 | 125.9 | 108.7 | 108.4 | 109.4 |
| 7:1 | 3.30 | 48.80 | 1.3658 | 124.8 | | 106.2 | | |
| 8:1 | 2.90 | 47.3 | 1.3690 | 129.0 | | 110.6 | | |
| 9:1 | 2.60 | 47.7 | 1.3720 | 124.9 | | 108.1 | | |
| 10:1 | 2.40 | 48.0 | 1.3758 | 126.6 | | 111.4 | | |
| 11:1 | 2.20 | 48.3 | 1.3790 | 126.3 | | 118.5 | | |
| 12:1 | 2.02 | 48.5 | 1.3800 | 126.3 | | 100.0 | | |
| 13:1 | 1.87 | 48.7 | 1.3820 | 124.0 | | 108.9 | | |
| 14:1 | 1.74 | 48.9 | 1.3848 | 132.2 | | 113.5 | | |
| 15:1 | 1.63 | 49.0 | 1.3854 | 114.7 | | 118.5 | | |
| 16:1 | 1.54 | 49.15 | 1.3865 | 111.7 | | 110.5 | | |
| 17:1 | 1.45 | 49.26 | 1.3878 | 108.9 | | 121.1 | | |
| 18:1 | 1.37 | 49.36 | 1.3886 | 124.9 | | 135.0 | | |
| 19:1 | 1.30 | 49.45 | 1.3890 | 126.6 | | 131.1 | | |
| 20:1 | 1.24 | 49.53 | 1.3900 | 126.3 | | 131.6 | | |

FIG. 4

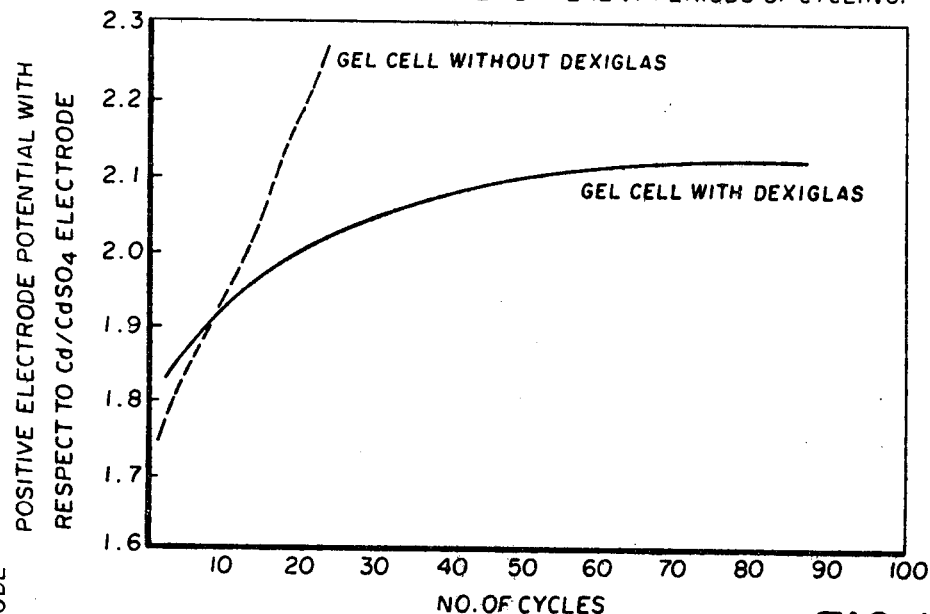
FIG.17 POSITIVE ELECTRODE POTENTIAL AT THE END OF CHARGEBACK OF GEL CELLS WITH AND WITHOUT DEXIGLAS AFTER DIFFERENT PERIODS OF CYCLING.
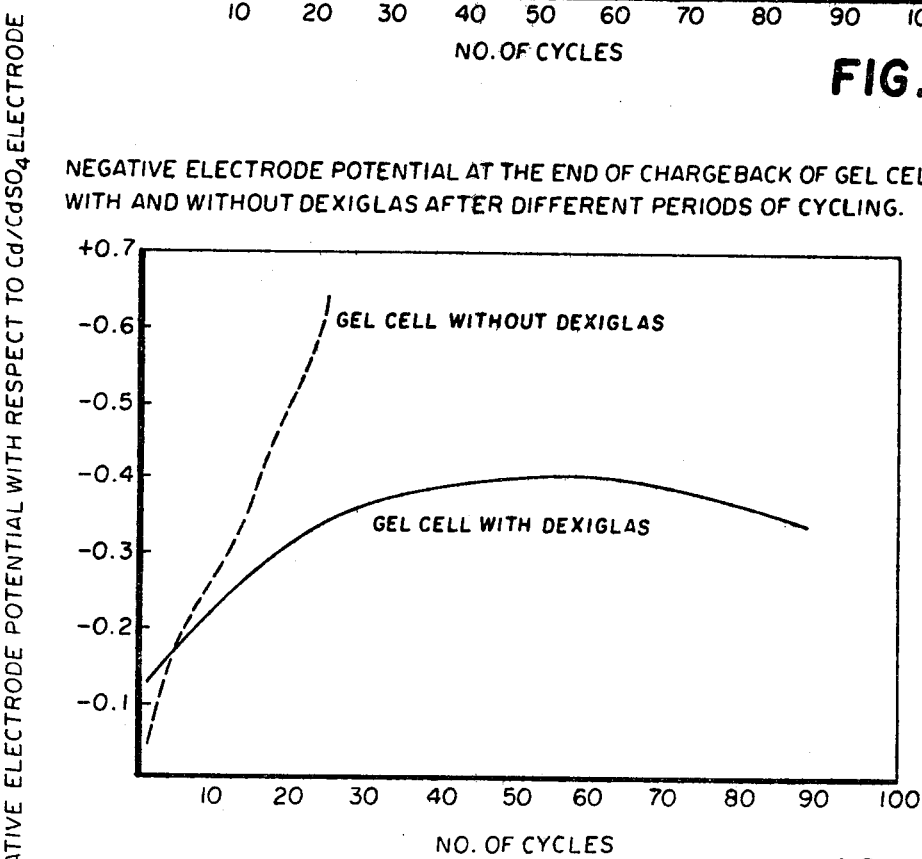
FIG.18 NEGATIVE ELECTRODE POTENTIAL AT THE END OF CHARGEBACK OF GEL CELLS WITH AND WITHOUT DEXIGLAS AFTER DIFFERENT PERIODS OF CYCLING.

LEAD ACID BATTERY WITH GEL ELECTROLYTE

BACKGROUND OF THE INVENTION

The present invention related to lead-acid batteries and more particularly to improvements in gel electrolytes and separator materials for use therein.

A gel may be regarded as a type of colloidal system behaving as a solid or relatively low elasticity. Various attempts have been made to gel the acidic electrolyte in storage battery cells to eliminate spilling, the need for constant maintenance and for other reasons. No satisfactory gel electrolyte has been produced, however, because batteries containing such gel electrolytes have not had electrical properties as good as those with ordinary liquid electrolytes. For example, their internal resistance is higher and capacity is lower in batteries incorporating a gel electrolyte. Also, the cycling characteristics of batteries containing the gel electrolyte have not compared well with batteries having liquid electrolytes. In addition to these disadvantages, gel electrolytes have had a tendency to shrink after a short time so that the contact between the gel electrolyte and the active mass in the battery cell is soon interrupted. Thus, cracks form in the gel electrolyte allowing air to carry oxygen to the plates or electrodes of the battery, allowing the electrodes to discharge. Furthermore, the initial viscosity of the gel is so great that it has been difficult, if not impossible, to completely fill the electrolyte chamber and the electrode pores with the gel electrolyte.

One such attempt at gelling an electrolyte was disclosed in British Pat. No. 785,848, issued to Robinson on Nov. 6, 1957. This patent discloses the use of fine particles of silica of submicron size, approximately 0.015 micron diameter, mixed with dilute sulfuric acid. The amount of silica in the final mixture is disclosed to be about 12% by weight. However, the problems described above still remain.

Another problem which affects the use of both liquid and gel electrolytes is the need to replace the electrolyte after formation of the cell. Presently, most lead-acid batteries are filled with low specific gravity electrolyte and the electrodes of the batteries are formed by placing a charge on them. After this formation process, the formation electrolyte is dumped out and is replaced with fresh electrolyte having the desired specific gravity. It is well known that if the low specific gravity formation electrolyte were not replaced, the battery would exhibit poor electrical properties.

The formation process is expensive for a number of reasons. Changing electrolyte after charging requires additional labor and time. Even though the formation electrolyte may be recycled, contaminants build up in the electrolyte. Eventually, the electrolyte must be either cleaned or discarded.

It is well known that separator material is placed between electrodes of batteries to prevent electrical shorting. Simultaneously, the separator material must also permit diffusion of electrolyte through its pores and the passage of electric current between the electrodes of batteries to prevent electrical shorting. Simultaneously, the separator material must also permit diffusion of electrolyte through its pores and the passage of electric current between the electrodes. Additionally, the separator material must be stable in the electrochemical environment, i.e., resist deterioration due to exposure to the electrolyte and the chemical reactions taking place on the electrodes. One of the long standing problems in improving batteries has been to make a separator material which optimized those various characteristics.

SUMMARY OF THE INVENTION

The present invention contemplates a gel electrolyte for use in a lead-acid battery. The gel electrolyte includes a silica component having silica particles, means for repelling the particles from each other and for catalyzing the formation of siloxane cross-linkages, and a sulfuric acid component. Additionally, the present invention includes a lead-acid battery incorporating the gel electrolyte. The lead-acid battery includes a container, a plurality of electrodes substantially enclosed by the container, and the gel electrolyte in a substantial physical contact with the plurality of electrodes.

A separator material for a lead-acid battery is also included in this invention. The separator material includes a silicate component integrally mixed with an oxygen compound of boron forming a microfiber mat. The mat has a pore size between about 0.5 to 10 microns in diameter and an electrical resistance of about 0.001 ohms per square inch for a 0.05 inch thickness. Additionally, the present invention includes a lead-acid battery which utilizes this separator material. Specifically, the battery includes a container, a plurality of electrodes substantially enclosed by the container, an electrolyte in substantial physical contact with the plurality of electrodes, and a separator material in physical contact with and substantially enveloping at least one of the electrodes.

This invention also encompasses a method of making a lead-acid battery having electrodes disposed in a container. The steps of this method include filling the electrolyte space of the battery with an electrolyte. Subsequently, the battery is substantially sealed and the electrodes of the battery are formed. Thus, the electrolyte is retained in the battery as the operational electrolyte.

Another method of making a lead-acid battery having electrodes disposed in a container is included in the present invention. The steps of this method include enveloping an electrode of the battery with a separator mixed with an oxygen compound of boron forming a microfiber mat. The mat has a pore size between about 0.5 to 10 microns in diameter and electrical resistance of about 0.001 ohms per square inch for a 0.05 inch thickness.

It is an object of the present invention to provide an electrolyte which can be used in situ for both the electrode as well as for battery service.

It is another object of this invention to provide an electrolyte which is economical to manufacture and use in lead-acid batteries.

Still another object of this invention is to provide an electrolyte which eliminates the additional time and expense required to change electrolyte after the formation process.

A further object of this invention is to provide an electrolyte which reduces gassing of the battery electrodes during cycling as compared to prior art cells.

A still further object of this invention is to provide a gel electrolyte which eliminates the need for constant maintenance during the life of the battery.

Another object of the present invention is to provide a gel electrolyte which improves the capacity of a battery.

Still another object of this invention is to provide a gel electrolyte which eliminates the possibility of spilling the electrolyte from a battery.

A further object of this invention is to provide a gel electrolyte which improves the cycle life of a battery compared to prior art cells.

A still further object of this invention is to provide a gel electrolyte which serves as a separator between the electrodes of a battery.

Another object of this invention is to provide a separator material which improves the capacity of the battery.

Still another object of the present invention is to provide a separator material which improves the cycle life of the battery.

A further object of this invention is to provide a separator material which is easily and conveniently disposed in contact with the electrodes of a battery.

For a better understanding of the present invention, together with other and further objects thereof, reference is had to the following description, taken in connection with the accompanying figures, while its scope will be pointed out in the appended claims.

BRIEF DESCRIPTION OF THE DRAWINGS

FIG. 4 is a compilation of the capacities after discharge at the 6-hour rate of two groups of cells utilizing the present invention in comparison with conventional cells representing the prior art.

FIG. 17 depicts positive electrode potentials at the end of discharge for cells, all of which are included in the present invention, having gel electrolyte with and without Dexiglas after different periods of cycling.

FIG. 18 shows negative electrode potentials at the end of discharge for cells, all of which are included in the present invention, having gel electrolyte with and without Dexiglas after different periods of cycling.

DETAILED DESCRIPTION OF THE INVENTION

Figure 1:
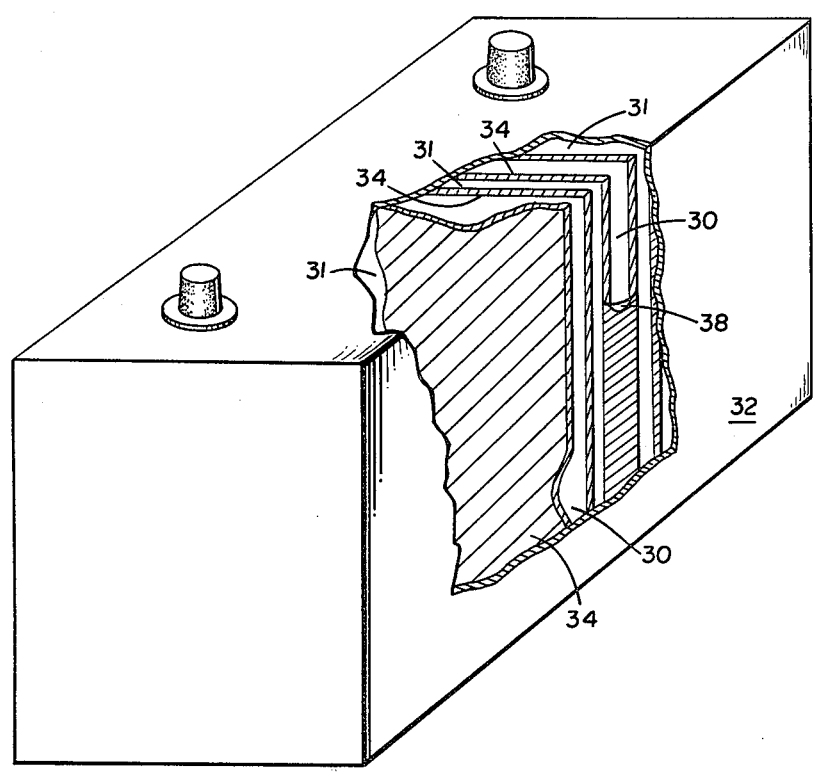
FIG. 1 is a perspective view of a battery utilizing separator material of the present invention.

The present invention contemplates an electrolyte for a lead-acid battery which includes a silica component having silica particles, means for repelling the particles from each other and catalyzing the formation of siloxane cross-linkages, and a sulfuric acid component.

Silica is the oxide of silicon, $SiO_2$. Silica is readily available commercially in numerous particle sizes and used accordingly in the present invention. In the preferred embodiment, the silica particles are less than about 1 micron in diameter. It should be understood that this invention is not intended to be limited by the amount of silica present in the electrolyte. Although any amount of silica may be used, a preferred embodiment has the silica component constituting less than about 30% of the electrolyte's weight. In a more preferred embodiment, the silica component constitutes between about 1 to 7% of the electrolyte's weight.

The sulfuric acid component in the electrolyte of the preferred embodiment measures between about 30 to 50% of the electrolyte's weight. This figure is calculated using sulfuric acid having a specific gravity of about 1.400 before mixing. A more preferred embodiment measures the sulfuric acid component between about 43 to 48% of the electrolyte's weight. Once again, this figure is calculated using sulfuric acid having a specific gravity of 1.400 before mixing. An alternative method of measuring the preferred amount of sulfuric acid in the electrolyte is to measure the specific gravity after mixing the sulfuric acid into the electrolyte. If this is done, the sulfuric acid component should have a specific gravity of about 1.200 to 1.390 in the preferred embodiment of the electrolyte.

It should be understood that the present invention contemplates use of the various means for repelling the silica particles from each other and catalyzing the formation of siloxane cross-linkages. The siloxane cross-linkage is a compound of silicon and oxygen in which each atom of silicon is bonded to four oxygen atoms, forming a tetrahedral structure, in a manner analogous to the bonding of carbon to hydrogen in methane, the bonds being of about the same strength in each case.

This structure is found in the dioxide and in silicates generally, where the $SiO_4$ groups occur in chains or rings. By creating siloxane cross-linkages, a gel is formed.

The silica particles can be repelled from each other by forming a liquid colloidal dispersion stabilized by electric charges, either all negative or all positive, whereas the particles are kept from colliding or flocculating by mutual electrical repulsion. A term used to describe this liquid colloidal dispersion is a sol state. The sol state is opposed to the gel state, in which the dispersion is a thick, semisolid mass.

One example of means for repelling the silica particles from each other and catalyzing the formation of siloxane cross-linkages is a plurality of hyroxyl ions. Hydroxyl ions have two important effects upon silica particles: they react with surface silanol groups on the silica particles to create negative surface charges which cause the silica particles to repel each other, thus inhibiting gel formation; and, they also directly catalyze the formation of siloxane cross-linkages for gel formation. As the pH decreases, such as upon the addition of sulfuric acid, particle charge decreases but sufficient hydroxyl ions remain to catalyze cross-linking. Thus, a gel is formed.

A preferred embodiment of the above mentioned means is an alkali component. A more preferred embodiment of the alkali component is to select the alkali from the group consisting of ammonium hydroxide, sodium hydroxide, and sodium aluminate. In the preferred embodiment, the alkali component is less than about 5% of the electrolyte's weight. In the more preferred embodiment, the alkali component is less than about 1% of the electrolyte's weight.

It should be understood that the invention contemplates the use of other components besides the three mentioned above. Other components listed for sake of example, and not intended as a limitation, are found in "Properties, Uses, Storage, and Handling Ludox Colloidal Silica" which is published by E. I. duPont de Nemours & Company. This article is hereby explicitly incorporated by reference.

One such componet is salt. In the preferred embodiment, the electrolyte includes a salt component selected from a group consisting of sodium chloride, ammonium chloride, ammonium acetate, and ammonium nitrate. The salt component in the preferred embodiment is less than about 5% of the electrolyte's weight.

The electrolyte can further include a sulfate component. In the preferred embodiment, the sulfate component constitutes less than about 5% of the electrolyte's weight.

The above mentioned electrolyte can be used in a lead-acid battery. The battery includes a container and a plurality of electrodes substantially enclosed by the container. An electrolyte of this invention is placed in substantial physical contact with the plurality of electrodes. In should be understood that various dimensions and types of containers as well as electrodes are contemplated for use in the present invention.

The present invention also includes a separator material for lead-acid battery. The separator material includes a silicate component integrally mixed with an oxygen compound of boron forming a microfiber mat. The mat having a pore size between about 0.5 to 10 microns in diameter and an electrical resistance of about 0.001 ohms per square inch for a 0.05 inch thickness.

A silicate is any of a broad range of mineral compounds comprises of from one to six silica groups $(SiO_2)$, arranged either in rings or chains. In a preferred embodiment, the silica component is more than about 40% of the layer's weight. A more preferred embodiment measures the silica component to be about 55 to 65% of the layer's weight.

The present invention contemplates the use of any oxygen compound of boron. In a preferred embodiment, the oxygen compound of boron measures about 0.5 to 15% of the layer's weight. In a more preferred embodiment, the oxygen compound of boron is selected from the group consisting of boron oxide and boric acid.

Although the microfiber mat contemplated by this invention may be of nearly any thickness, the preferred embodiment is to have the layer measure about 0.01 to 0.1 inches in thickness. In the more preferred embodiments of the layer contemplated by the present invention, the electrical resistance is preferred to be as small as possible. Whereas, in the preferred embodiment, the electrical resistance of the layer is about 0.001 ohms per square inch for a 0.050 inch thickness.

The above mentioned separator material can be used in a lead-acid battery. The battery includes a container, a plurality of electrodes substantially enclosed by the container, and an electrolyte in substantial physical contact with the plurality of electrodes. A separator material of this invention is placed in physical contact with and substantially envelopes at least one of the electrodes. It should be understood that various dimensions and types of containers as well as electrodes are contemplated for use in the present invention.

FIG. 1 shows a perspective view of a battery having a plurality of positive electrodes 30 and negative electrodes 31 substantially enclosed by a container 32. A separator material 34 is positioned between the positive and negative electrodes. It is preferred, although not necessary, for the separator material to be in substantial contact with the whole face of the electrode. The plate dimension or number of plates is not intended to be limited.

FIG. 1 also illustrates a preferred embodiment of the invention. All of the negative electrodes 31 are placed in substantial physical contact with the separator material 34. However, it should be understood that the present invention contemplates the use of the separator material in substantial contact with any combination of positive or negative electrodes.

A more preferred embodiment contemplates a separator which covers both sides and the bottom of all the negative electrodes 31 with the separator material 34. This is shown in FIG. 1 at point 38. Any conventional means may be used to envelope the separator material about the electrode. It should be understood that the present invention is not intended to be limited to any particular style of envelope or wrap placing the separator material in contact with the electrode. For example, a continuous wrap may be used or separate sheets of the separator material may be sealed by any conventional means creating an envelope configuration.

A battery having the separator material may also use an electrolyte of the present invention. As stated elsewhere in the specifications, the electrolyte would be in substantial contact with the plurality of electrodes.

A method included in the present invention for making a lead-acid battery having electrodes disposed in a container includes filling the electrolyte space of the battery with the novel electrolyte of the present invention. Subsequently, the battery may be substantially sealed and the electrodes of the battery are formed. Typical formation processes will be discussed later in the specification. It should be understood that the battery may be formed before it is sealed. A major object of the present invention is not to have to remove and replace the electrolyte after the formation process. The sequence and number of steps following the filling of the electrolyte space is not intended to be limited.

Another method of making a lead-acid battery having electrodes disposed in a container includes the step of enveloping an electrode of the battery with the novel separator material of the present invention. The separator material has the same characteristics as discussed elsewhere in the specification.

Having described the invention in general terms, the following examples are set forth to more fully illustrate the preferred embodiments of the invention. These examples, however, are not meant to be limiting. It is possible to produce still other embodiments without departing from the inventive concept herein disclosed. Such embodiments are within the ability of one skilled in the art.

EXAMPLE 1

The characteristics of gel containing various amounts of silica, alkali, and sulfuric acid were studied by mixing in laboratory beakers different volumes of sulfuric acid having the specific gravity of 1.400 and Ludox (SM-30). Ludox (SM-30) is manufactured by E. I. duPont de Nemours & Company. Typical properties of Ludox (SM-30) are:

| | |
|---|---|
| Stabilizing counter ion | Sodium |
| Particle charge | Negative |
| Av. particle diameter, nm | 7 |
| Specific surface area, $m^2/g$ | 360 |
| Silica (as $SiO_2$), wt % | 30 |
| pH (25° C., 77° F.) | 9.9 |
| Titratable alkali (as $Na_2O$), wt % | 0.56 |
| $SiO_2/Na_2O$ (by wt) | 54 |
| Chlorides (as NaCl), wt % | 0.01 |
| Sulfates (as $Na_2SO_4$), wt % | 0.03 |
| Viscosity (25° C., 77° F.), cP, mPa . s | 6 |
| Wt. per gallon (25° C., 77° F.), lb | 10.0 |
| Specific gravity (25° C., 77° F.) | 1.22 |

Figure 2:
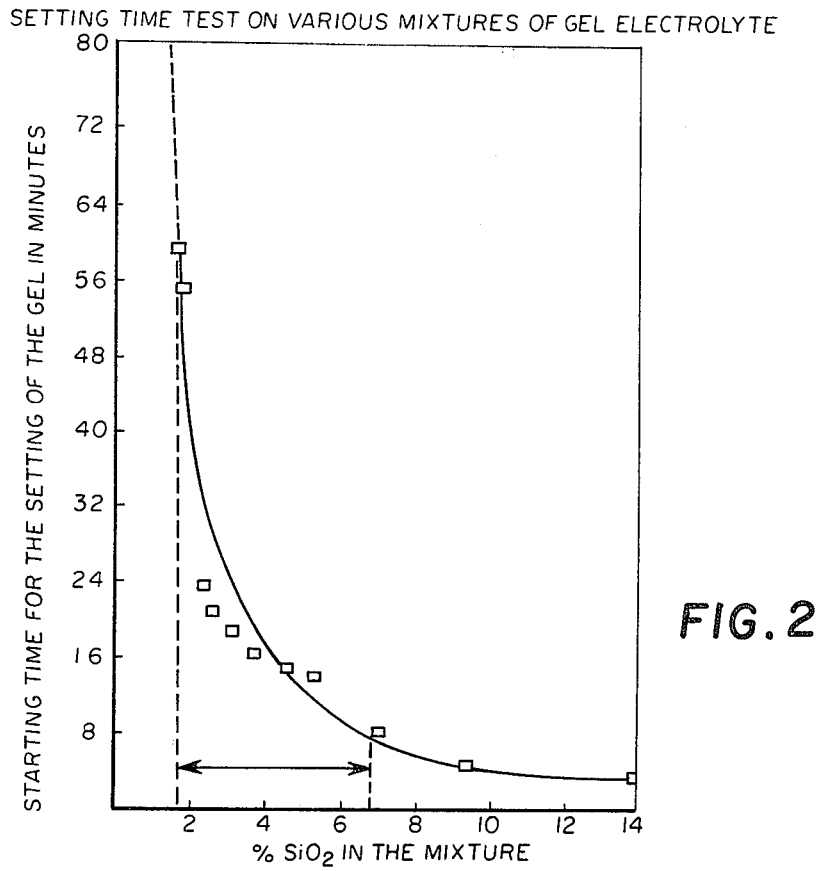
FIG. 2 depicts the setting time of various mixtures of gel electrolytes included in the present invention.

A total of 10 mixtures were prepared and the setting times needed for a gel to form out of liquid mixtures are recorded in FIG. 2. As indicated in the figure, the gels with a setting time which is convenient to use have a silica content of about 1 to 7% by weight.

Figure 3:
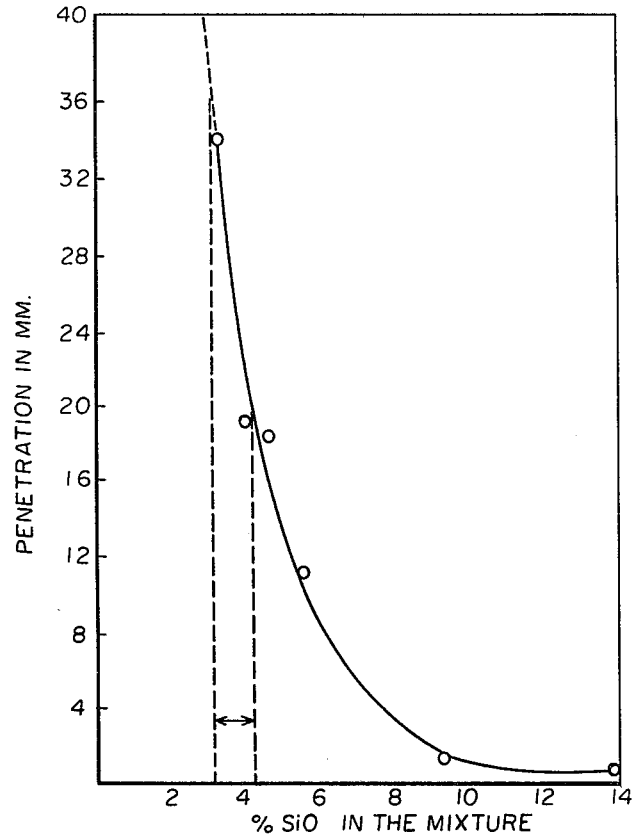
FIG. 3 depicts the results of a penetration test on various mixtures of gel electrolytes included in the present invention.

The gels were subjected to a penetration test to measure their relative hardness. Samples of the gels were placed in beakers. A hydrometer float 5 inches in length, ⅝ inches in diameter and weighing 8 grams was attached to the end of a shaft weighing 36 grams. The shaft was suspended in a position where the float met its image at the surface of the gel. The shaft and float were released and allowed to penetrate the gel. The measurements of the penetration are shown in FIG. 3. A preferred range of embodiments which display the desired characteristics discussed previously have a silica content between about 3 to 4% by weight.

Three groups of cells were formed with the 15 mixtures of sulfuric acid and Ludox SM-30 having an acid/Ludox ratio of 6:1 through 20:1. The first five mixtures were not selected because of their high hardness values as indicated by FIG. 3.

The first group of cells consisted of 15 cells, each having a different acid/Ludox ratio. The cells included five positive and negative plates constructed with lead-4.5% antimony grids. The dimensions of the plates were approximately 3 inches in length, 2.5 inches in width and 0.27 inches in depth. For each of the cells, the total rated capacity was 12 ampere-hours. The positive and negative plates were separated by S-shaped spacers which were made out of microporous rubber material. These spacers were inert to the electrolyte and their purpose was simply to prevent the electrodes from touching each other. The negative plates were wrapped with a material called Dexiglas Mat, Grade X-4225. This material is manufactured by the C. H. Dexter Company and is a binderless, glass microfiber mat of 100% glass composition. Fiber diameter ranges from less than one micron to several microns. Typical properties of this material are:

| | |
|---|---|
| Thickness: | 0.050" |
| Softening Point: | 1254° F. |
| Pore Size: | 1 micron (by bubble method) |
| Glass Composition: | All "C" grade |
| Air Permeability: | 8.5 LPM per 100 $CM^2$ at a pressure differential of 12.7 mm of $H_2O$. (.050" th.) |
| Tensile Strength: | Dry, 1500 grams per 25 mm width in machine direction. Tensile strength, dry, is 950 grams in cross machine direction. (.050" th.) |
| Electrical Resistance: | 0.001 Ohms per $inch^2$ for 0.050 inch thickness. |
| Material Weight: | 170 grams per $meter^2$ (.050" th.) |
| Solubility: | In boiling 1 normal sulfuric acid for a period of 1 hour is 9% - (primarily sodium). |

The second group of cells included one cell for each of the 15 acid/Ludox ratios. The cells were of the same construction as the first group of cells except that the negative plates were not wrapped with any material.

The third group of cells included six cells of the same construction as the first group of cells except that the positive and negative plates were separated by means of conventional microporous separator material. Thus, spacers were not used to separate the positive and negative plates. Also, instead of a gel electrolyte of the present invention, conventional liquid sulfuric acid having a specific gravity of 1.250 was used as electrolyte. The performance of the conventional cells is representative of both liquid and gel electrolytes in the prior art and the cells serve as a control group.

All three groups of cells underwent the following formation process. The cells were subjected to 120 hours of formation split between two stages of 0.4 amps for 4 hours following by 0.8 amps for 116 hours. Following the completion of the formation process, it was found that only the first four compositions representing an acid/Ludox volume of 6:1 through 9:1 retained their gel-like consistency.

The three groups of cells were discharged at the 6-hour rate to determine their capacities. The results of these tests are given in FIG. 4. Unexpectedly, the two groups of gel cells of the present invention (with and without Dexiglas Mat) gave capacities equal to or higher than the group of conventional cells. The gel cells with the Dexiglas material gave the highest capacity overall.

Figure 5:
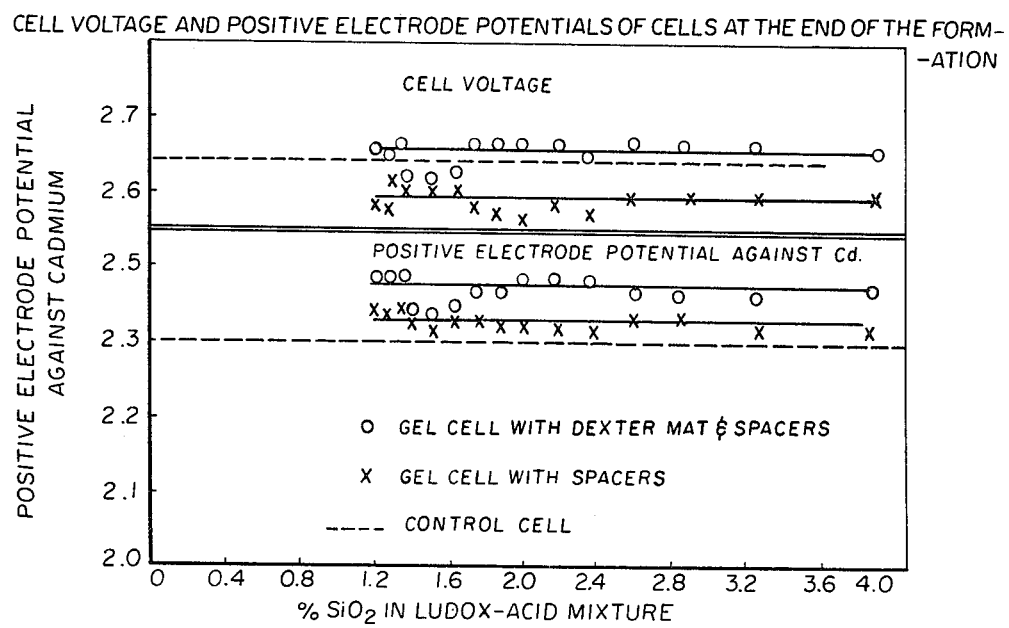
FIG. 5 compares the battery cells utilizing the present invention with conventional cells representing the prior art in regard to cell voltage and positive electrode potentials at the end of formation.

FIG. 5 demonstrates the cell voltages and positive potentials of the three groups of cells. Clearly, and unexpectedly, the gel cell with the Dexiglas material had higher cell voltages and positive potentials than the other two groups of cells.

Figure 6:
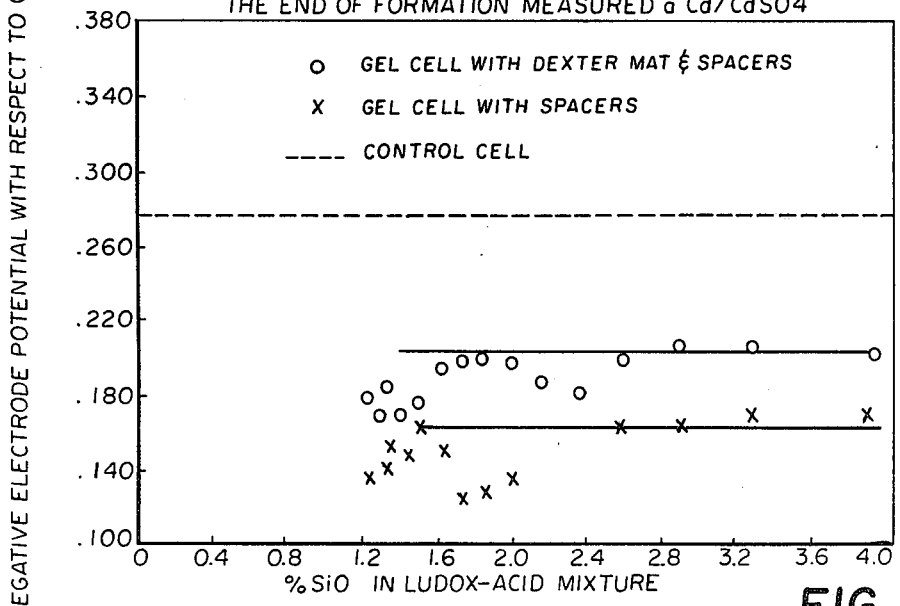
FIG. 6 compares battery cells utilizing the present invention with conventional cells representing the prior art in regard to negative electrode potentials at the end of the formation measured against $Cd/CdSO_4$.

FIG. 6 depicts the negative electrode potentials for the three groups of cells. Once again, the gel cells unexpectedly performed as well as the conventional cells. The gel cells had a slightly lower negative electrode potential than the conventional cells but, totally within acceptable standards. These potentials were measured against a cadmium/cadmium sulfate electrode.

EXAMPLE 2

Four cells were constructed with lead-4.5% antimony grids for both the positive and negative plates. The dimensions of the plates were approximately 16 inches in length, 5.5 inches in width and 0.25 inches in depth. For each of the cells, conventional microporous separator material wrapped the plates and the total rated capacity was 320 ampere-hours. The cells were then placed in liquid sulfuric acid electrolyte having a specific gravity of 1.300. All of the cells were then subjected to 120 hours of formation split between two stages of 0.4 amps for 4 hours followed by 0.8 amps for 116 hours. Following the formation process, the cells were cycled by discharging them to 100% depth of discharge at the 6-hour rate and charging them back with 110% of the output charge. An hour rate is defined as the time period in which the cell is totally discharged. Therefore, a higher hour rate will allow one to discharge a cell by draining less amperes over a longer time period.

Following these capacity buildup cycles, the separator wrap in two of the cells were removed. Substituted in place of the separators were small pieces of microporous rubber spacers disposed between the positive and negative plates. These spacers were inert to the electrolyte and their purpose was simply to prevent the electrodes from touching each other. A gel electrolyte of the present invention was then placed in these two cells.

The gel electrolyte was prepared by mixing together one part by volume Ludox SM-30 with three parts by volume of sulfuric acid having a specific gravity of 1.400.

The two cells having the conventional separators used in formation were placed in fresh liquid sulfuric acid having a specific gravity of 1.300. This set of conventional cells represented cells of the prior art and served as a control set. Different tests were then performed upon both sets of cells.

Figure 7:
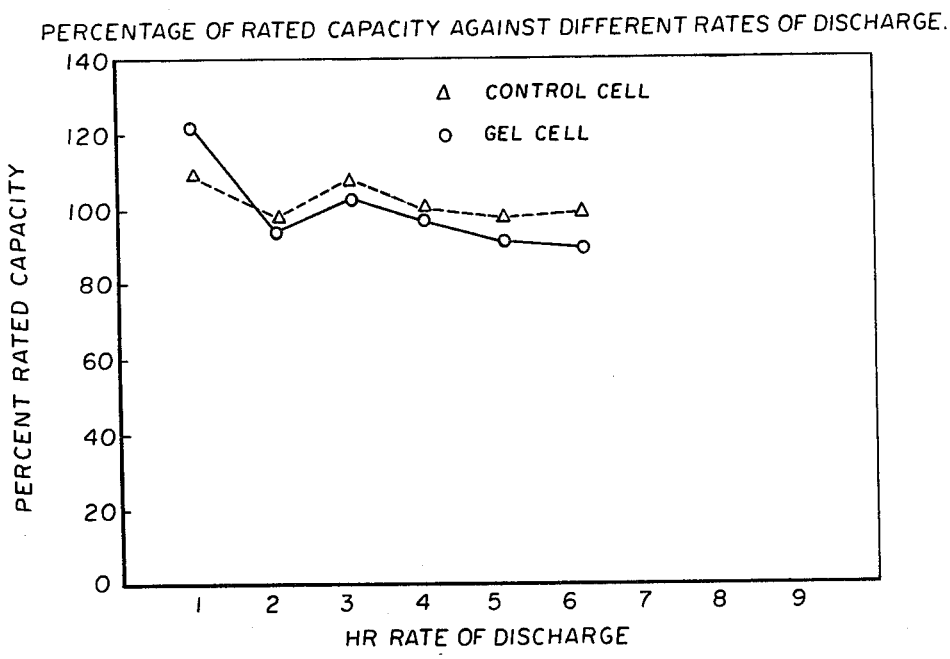
FIG. 7 shows a comparison of battery cells utilizing the present invention with conventional cells representing the prior art in regard to the percentage of rated capacity against different rates of discharge.
Figure 8:
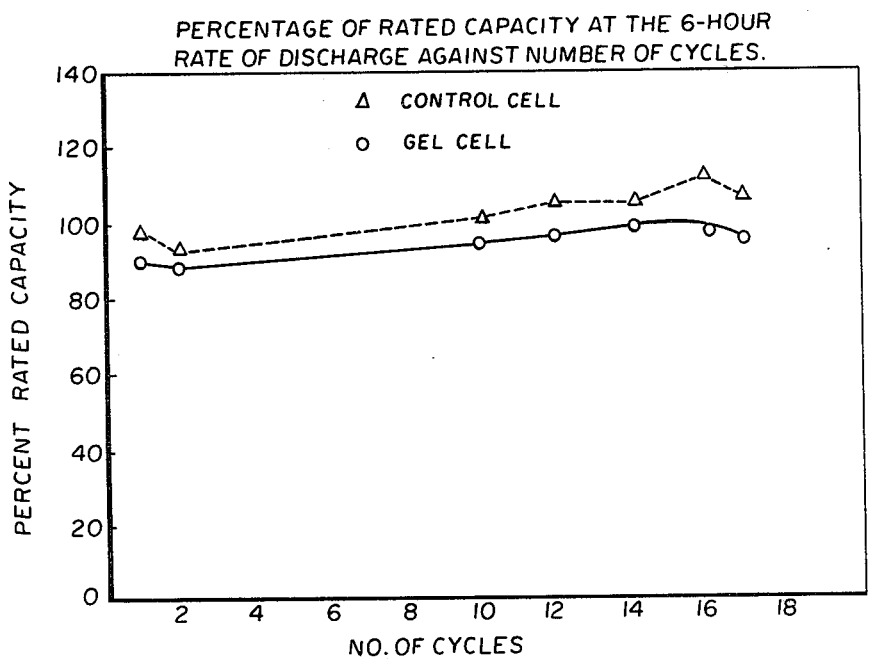
FIG. 8 compares battery cells utilizing the present invention with conventional cells representing the prior art in regard to the percentage of rated capacity at the 6-hour rate of discharge against the number of cycles.

The capacity performances of the two sets of cells are shown in FIG. 7. Both the conventional cells and the gel cells of the present invention exhibit comparable discharge capacity at various rates of discharge. These discharge rates are the time periods in which the cells were discharged 100%.

FIG. 6 reflects the percentage of rated capacity at the 6-hour rate of discharge against the number of cycles. Unexpectedly, the gel cells of the present invention performed as well as the conventional cells.

Figure 9:
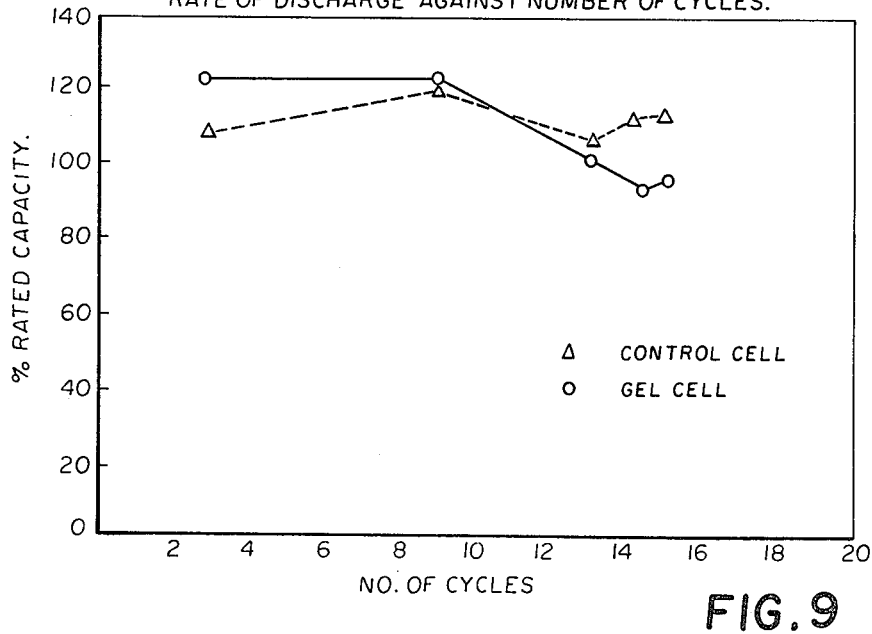
FIG. 9 compares the battery cells utilizing the present invention with conventional cells representing the prior art in regard to the percentage of rated capacity at the 1-hour rate of discharge against the number of cycles.

FIG. 9 shows the percentage of rated capacity at the 1-hour rate of discharge against the number of cycles. Once again, the gel cells of the present invention had similar performance to the conventional cells.

Figure 10:
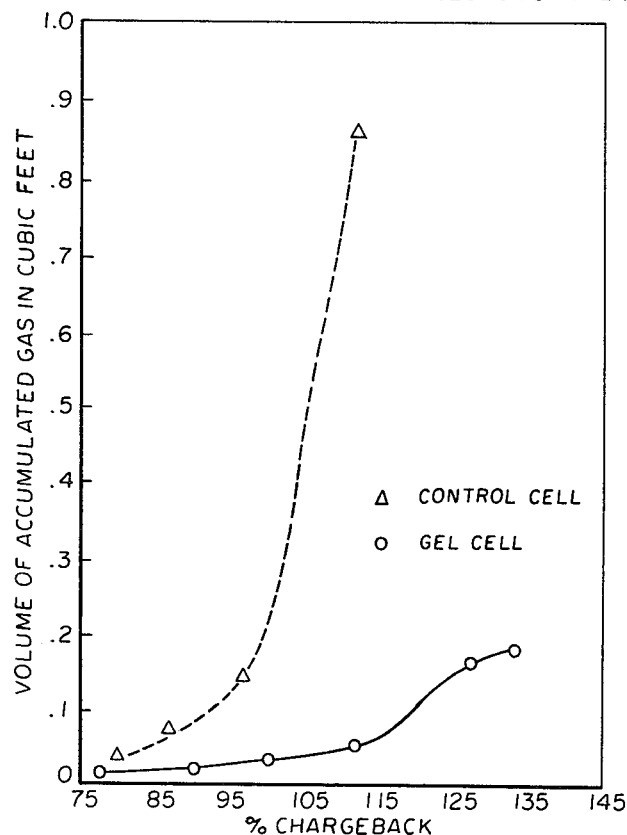
FIG. 10 compares battery cells of the present invention with conventional cells representing the prior art in regard to the gas evolution against percentage of chargeback of the discharge capacity.

FIG. 10 shows the gas evolution characteristics of the conventional cells and the gel cells of the present invention after being subjected to different percentages of chargeback. The chargeback is based on the charge taken out during capacity discharge prior to the chargeback. The figure shows that with 110% of chargeback, a conventional cell produced a total of 0.8 cubic feet of gas. Unexpectedly, with the same amount of chargeback, the total volume of the accumulated gas produced by a gel cell was less than 0.05 cubic feet. These dramatic results demonstrate that a gel cell of the present invention produces over 16 times less gas than the comparable prior art cell. Even with a chargeback of 135%, the total gas evolved in a gel cell of the present invention was less than 0.2 cubic feet. Therefore, even with considerably more chargeback, a gel cell of the present invention clearly has superior performance over prior art cells.

Figure 11:
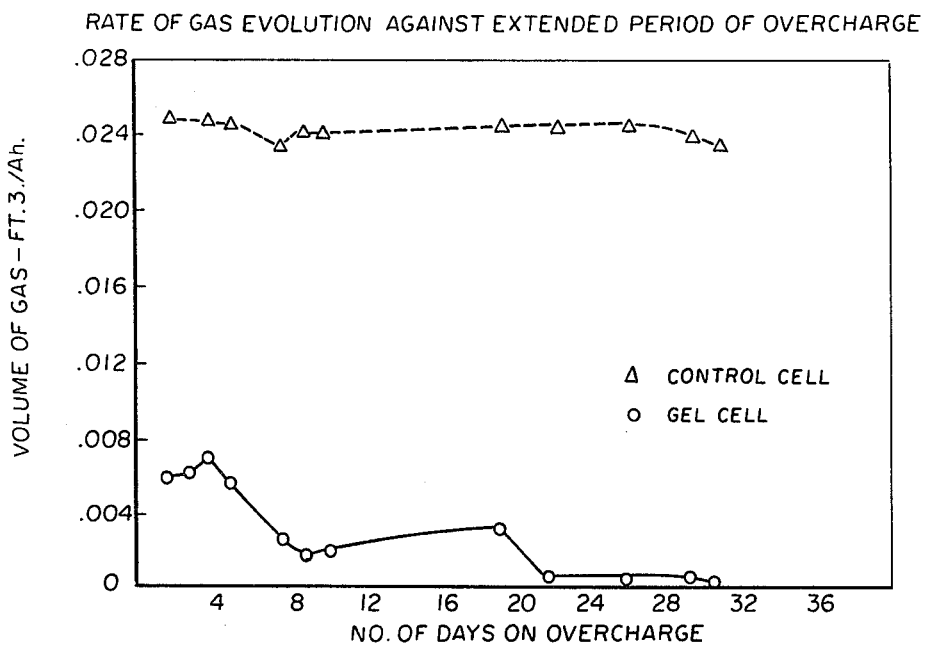
FIG. 11 compares battery cells utilizing the present invention with conventional cells representing the prior art in regard to the rate of gas evolution against an extended period of overcharge.

FIG. 11 shows the results of the rate of gas evolution by the two sets of cells over an extended period of overcharge. During the continuous overcharge period of 30 days, the rate of gas evolution of the conventional cells remains constant at approximately b 0.024 cubic feet per ampere hour. Wholly unexpectedly, a gel cell of the present invention has a rate of gas evolution of approximately 0.006 cubic feet per ampere hour. Even more dramatically, this rate was decreasing during the overcharge, eventually becoming negligible at the end of the thirty day period. Therefore, the problem of gassing in a maintenance free, sealed cell would be eliminated by a cell encompassing the present invention.

EXAMPLE 3

Three cells were constructed with lead-4.5% antimony grids for both the positive and negative plates. The dimensions of the plates were approximately 15 inches in length, 5.5 inches in width, and 0.25 inches in depth. For each of the cells, the total rated capacity was 450 ampere-hours. The negative plates of the cells were wrapped with Dexiglas material and the positive and negative plates were separated by S-shaped spacers. The three cells were respectively filled with 4:1, 5:1, and 6:1 volume mixtures of sulfuric acid having the specific gravity of 1.400 and Ludox SM-30 which respectively gave the silicon dioxide content of 5.4%, 4.5% and 3.8%.

A conventional cell was constructed having the same design as those above except that a conventional microporous separator material was substituted in place of the Dexiglas material, S-shaped spacers were not used between the positive and negative plates and conventional liquid sulfuric acid having a specific gravity of 1.250 was used as the electrolyte. This conventional cell represented cells of the prior art served as control.

The four cells underwent the formation process described in Example 1. Subsequent to the formation process, the four cells were subjected to four cycles of discharge at the 6-hour rate following by 110% chargeback.

Figure 12:
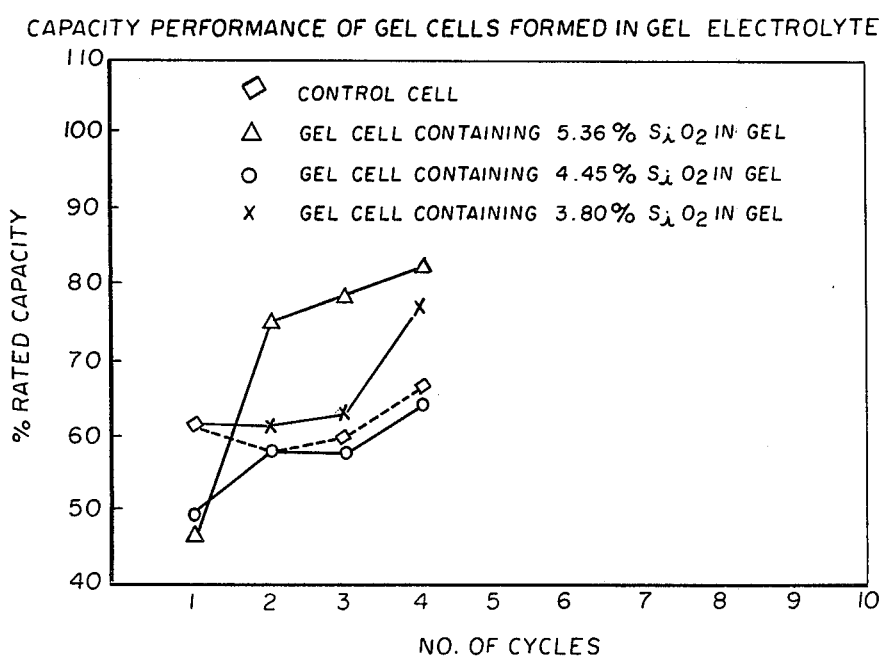
FIG. 12 compares battery cells utilizing the present invention with conventional cells representing the prior art in regard to the capacity performance against the number of cycles.

FIG. 12 depicts the capacities of the cells after the four discharges. Unexpectedly, and quite dramatically, the gel cells of the present invention alleviated the problems associated with formation of the battery after is has been assembled. The gel electrolyte can now be used in situ, thereby eliminating the time and expense involved with changing electrolyte after the formation process.

EXAMPLE 4

Two groups of cells were constructed having the same plate dimensions and number of plates as in Example 1. The first groups of cells separated the positive and negative plates by using S-shaped spacers made out of microporous rubber material. The second group of cells had the negative plates wrapped with Dexiglas Mat and once again separated the positive and negative plates with S-shaped spacers of the same rubber material.

Both groups of cells were subsequently filled with gel electrolyte. The gel used for both groups of cells was prepared by mixing sulfuric acid having a specific gravity of 1.400 and Ludox (SM-30) and in the acid/Ludox ratio of 6:1 by volume.

A formation period then followed the filling of the cells. The following procedure was used to form the cells. Approximately 120 hours of formation were split between two stages of 0.4 amps for 4 hours followed by 0.8 amps for 116 hours.

Figure 13:
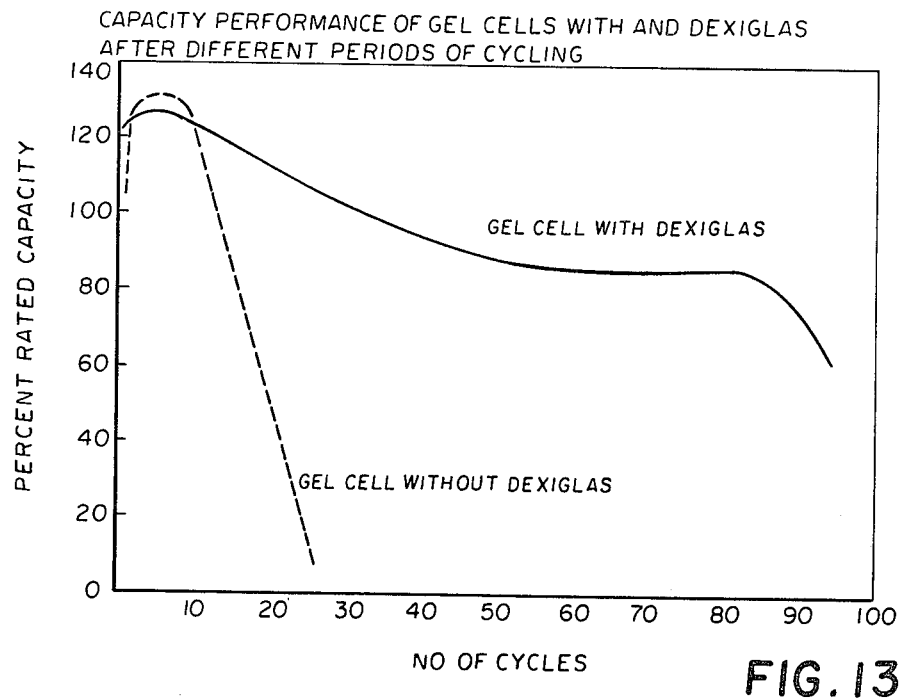
FIG. 13 depicts the capacity performance of battery cells, all of which are included in the present invention, having gel electrolyte with and without Dexiglas after different periods of cycling.

Following the formation period, the cells were cycled by discharging them to 100% depth of discharge at an 6-hour rate and charging them back with 100% of the output charge. FIG. 13 depicts the performance by cycle of the two groups of cells. The capacity of the group of cells used as the control dropped below 80% of their rated value after 17 cycles. Unexpectedly, the group of cells using the Dexiglas wrap on the negative plates gave 84 cycles before their capacity dropped below 80%. The cells of the present invention utilizing the Dexiglas wrap show a dramatic improvement in capacity of approximately 500% over the cells without Dexiglas.

Figure 14:
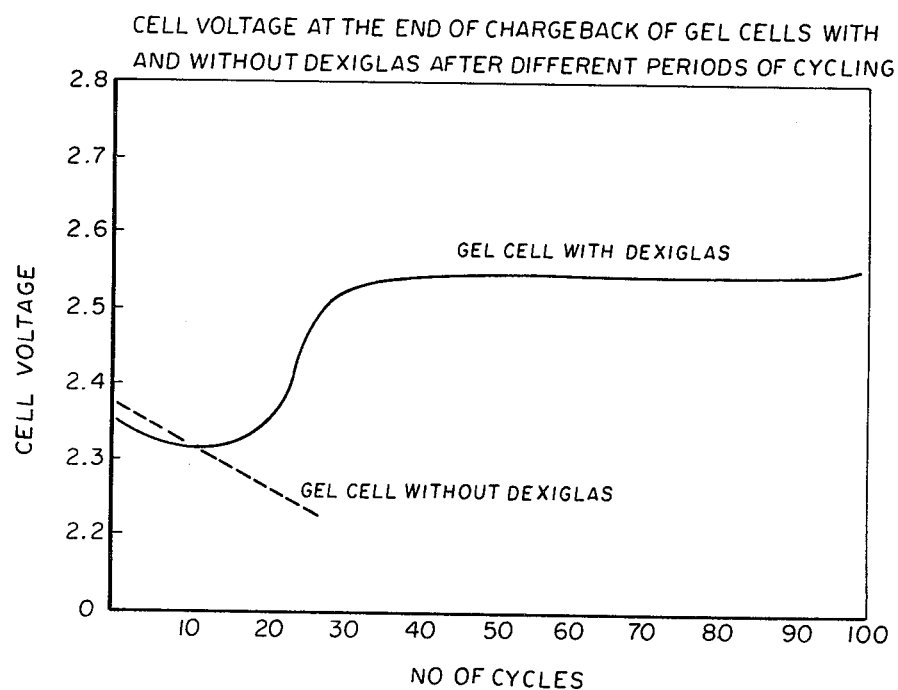
FIG. 14 shows the cell voltages at the end of chargeback for cells, all of which are included in the present invention, having gel electrolyte with and without Dexiglas after different periods of cycling.

FIG. 14 shows the cell voltage of the two groups of cells at the end of chargeback. The group of cells without Dexiglas indicated a continuous decrease in the cell voltage early in the period of cycling. By the end of cycle 22, their capacity was less than 20% of the rated value. The voltage of the cell at the end of chargeback had lowered to a value of 2.25 volts from the initial value of 2.38 volts recorded after the first cycle. The cells with Dexiglas had a voltage at the end of chargeback of 2.52 even after 100 cycles.

Figure 15:
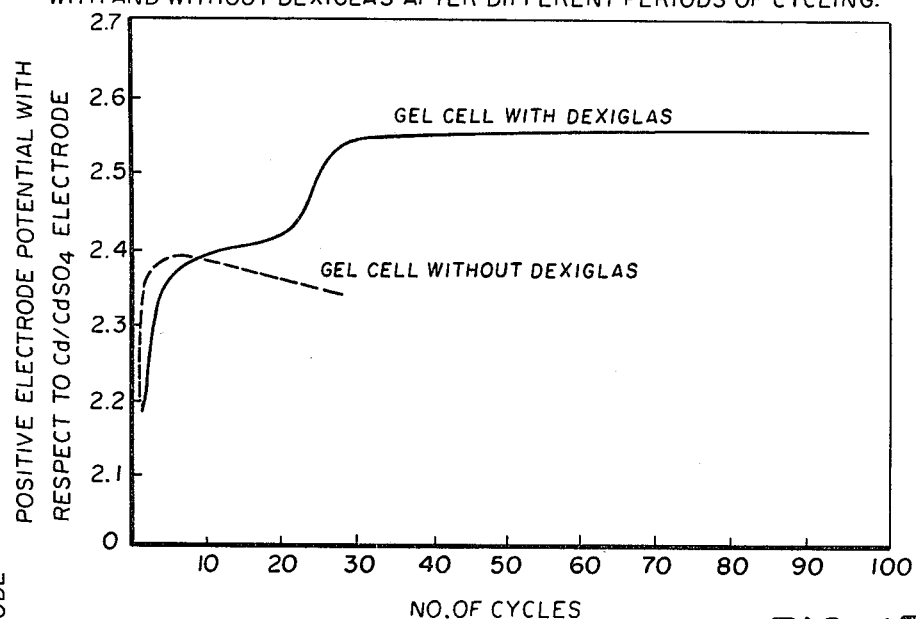
FIG. 15 shows positive electrode potentials at the end of chargeback for cells, all of which are included in the present invention, having gel electrolyte with and without Dexiglas after different periods of cycling.
Figure 16:
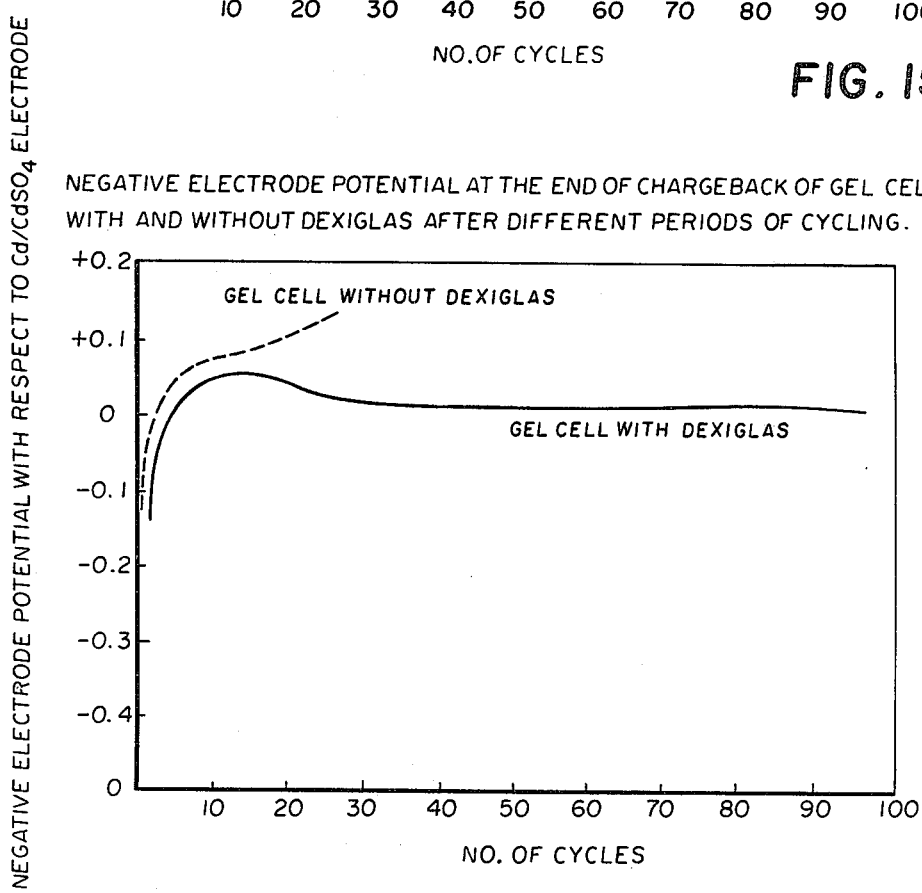
FIG. 16 shows negative electrode potentials at the end of chargeback for cells, all of which are included in the present invention, having gel electrolyte with and without Dexiglas after different periods of cycling.

The positive electrode potentials for the two groups of cells are depicted in FIG. 15. These potentials were measured with a Cd/CdSO$_4$ electrode. The negative electrode potentials of the two groups of cells at the end of chargeback during cycling are given in FIG. 16. These negative potentials are measured with the same electrode used in FIG. 4. The group of cells using the Dexiglas showed a surprisingly high resistance to degradation of the negative electrode as compared to the group of cells without Dexiglas.

FIG. 17 reflects the positive electrode potential at the end of discharge of the two groups of cells after different periods of cycling. The cell voltage was 1.70 volts during the period of cycling.

FIG. 18 indicated the negative electrode potential at the end of discharge of the two groups of cells during the period of cycling represented by FIG. 17. Once again, the negative electrode showed surprisingly little degradation.

As demonstrated by these examples, this invention provides a gel electrolyte which eliminates the need for constant maintenance during the life of the battery and the possibility of spilling the electrolyte from the battery. The gel electrolyte not only reduced gassing of the battery electrodes during cycling but also improves the cycle life and capacity of the battery compared to prior art cells. Additionally, the gel electrolyte serves as a separator between the electrodes of a battery, therefore, eliminating the need for separator material to be used.

This invention provides an economical electrolyte which can be used in situ for both the formation of battery electrodes as well as later cycling of the battery service. The electrolytes of this invention eliminate the additional time and expense caused by the need to change electrolyte after use in the formation process.

This invention also provides a separator material which is easily and conveniently disposed in contact with the electrodes of a battery. As demonstrated throughout the specification, the separator material of the present invention improves the capacity and the cycle life of a battery compared to prior art cells.

Although the invention has been described and illustrated in detail, it is to be clearly understood that the same is by way of illustration and example only and not to be taken by way of limitation, the spirit and scope of the invention being limited only by the terms of the appended claims.

I claim:

1. A lead-acid battery comprising a container; a plurality of alternating positive and negative electrodes disposed in said container; separator means disposed between said electrodes and comprising a silicate component integrally mixed with an oxygen compound of boron to form a microfiber glass mat; and a gel electrolyte in substantial physical contact with said positive and negative electrodes and separators in each cell, said electrolyte comprising a sulfuric acid component and a silica component derived from an aqueous colloidal dispersion of silica particles with means causing a negative electric charge on the surface thereof to cause said particles to repel each other and catalyze the formation of siloxane cross-linkages.

2. A lead-acid battery as recited in claim 1, wherein said separator means has a pore size between about 0.5 to 10 microns in diameter.

3. A lead-acid battery as recited in claim 1, wherein said silicate component of said separator means comprises more than 40 percent of the weight of the separator material.

4. A lead-acid battery as recited in claim 1, wherein said oxygen compound of boron comprises about 0.5 percent to 15 percent of the weight of the separator material.

5. A lead-acid battery as recited in claim 1, wherein said oxygen compound of boron is selected from the group comprising boron oxide, boric acid and mixtures thereof.

6. A lead-acid battery as recited in claim 1, wherein said separator means has an electrical resistance of about 0.001 ohms per square inch for a 0.05 inch thickness.

7. A lead-acid battery as recited in claim 1, wherein said gel electrolyte has a sulfuric acid component in an amount between about 30 percent to 50 percent of the electrolyte weight, calculated using 1.400 specific gravity acid prior to mixing.

8. A lead-acid battery as recited in claim 1, wherein the silica component of said gel electrolyte is less than about 30 percent of the electrolyte weight.

9. A lead-acid battery as recited in claim 1, wherein the silica component of said gel electrolyte is between about 1 percent to 7 percent of the electrolyte weight.

10. A lead-acid battery as recited in claim 1, wherein said sulfuric acid component is about 43 percent to 48 percent of the electrolyte weight.

11. A lead-acid battery as recited in claim 1, wherein said sulfuric acid component in the gel electrolyte has a specific gravity of about 1.200 to 1.390 after mixing of the electrolyte.

12. A lead-acid battery as recited in claim 1, wherein said silicate component of said separator means comprises about 55 percent to 65 percent of the weight of the separator material.

13. A lead-acid battery as recited in claim 1, wherein said separator means has a thickness of about 0.01 to 0.1 inch.

14. A lead-acid battery comprising:
   a. a container;
   b. a plurality of alternating positive and negative electrodes disposed in said container;
   c. electrode spacers disposed between said plurality of positive and negative electrodes; and
   d. a gel electrolyte disposed between and in substantial physical contact with said plurality of electrodes in each cell, said electrolyte comprising a sulfuric acid component and a silica component derived from an aqueous colloidal dispersion of silica particles with means causing a negative electric charge on the surface of said particles to cause said particles to repel each other and catalyze the formation of siloxane cross-linkages.

15. A lead-acid battery as recited in claim 14, wherein said gel electrolyte has a sulfuric acid component in an amount between about 30 percent to 50 percent of the electrolyte weight, calculated using 1.400 specific gravity acid prior to mixing.

16. A lead-acid battery as recited in claim 14, wherein the silica component of said gel electrolyte is less than about 30 percent of the electrolyte weight.

17. A lead-acid battery as recited in claim 14, wherein the silica component of said gel electrolyte is between about 1 percent to 7 percent of the electrolyte weight.

18. A lead-acid battery as recited in claim 14, wherein said sulfuric acid component is about 43 percent to 48 percent of the electrolyte weight.

19. A lead-acid battery as recited in claim 14, wherein said sulfuric acid component has a specific gravity of about 1.200 to 1.390 after mixing of the electrolyte.

* * * * *